US012679490B2

(12) United States Patent
    Kovacs

(10) Patent No.: US 12,679,490 B2
(45) Date of Patent: Jul. 14, 2026

(54) WINDSHIELD MOTOR GEAR

(71) Applicant: Steven Charles Kovacs, Umatilla, FL (US)

(72) Inventor: Steven Charles Kovacs, Umatilla, FL (US)

( * ) Notice: Subject to any disclaimer, the term of this patent is extended or adjusted under 35 U.S.C. 154(b) by 328 days.

(21) Appl. No.: 18/613,795

(22) Filed: Mar. 22, 2024

(65) Prior Publication Data

US 2025/0145240 A1 May 8, 2025

Related U.S. Application Data

(60) Provisional application No. 63/596,838, filed on Nov. 7, 2023.

(51) Int. Cl.
    *B62J 17/04* (2006.01)

(52) U.S. Cl.
    CPC ..................................... *B62J 17/04* (2013.01)

(58) Field of Classification Search
    None
    See application file for complete search history.

(56) References Cited

U.S. PATENT DOCUMENTS

| | | | |
|---|---|---|---|
| 3,906,563 A | 9/1975 | Bramhall | |
| 4,027,914 A | 6/1977 | Yamamoto et al. | |
| 4,529,242 A | 7/1985 | Watanabe et al. | |
| 4,606,571 A * | 8/1986 | Fujita ....................... | B62J 17/04 296/89 |

| | | | |
|---|---|---|---|
| 4,696,509 A * | 9/1987 | Yagasaki ................... | B62J 17/04 296/78.1 |
| 5,274,876 A | 1/1994 | Wehrspann | |
| 5,468,040 A | 11/1995 | Hsieh et al. | |
| 5,816,099 A | 10/1998 | Turbessi et al. | |
| 6,598,259 B1 | 7/2003 | Ketola | |
| 7,739,771 B2 | 6/2010 | Powell, Jr. | |
| 7,878,571 B2 * | 2/2011 | Misaki ..................... | B62J 17/04 296/180.5 |
| 9,608,497 B2 | 3/2017 | Heuberger et al. | |
| 11,167,727 B2 | 11/2021 | Srinivas et al. | |
| 11,230,267 B2 | 1/2022 | LoSacco | |
| 11,420,594 B2 | 8/2022 | Vadgaonkar et al. | |

(Continued)

FOREIGN PATENT DOCUMENTS

DE          3609595 A1 *  9/1987  .............. B62J 17/04

*Primary Examiner* — Joseph D. Pape
(74) *Attorney, Agent, or Firm* — Dunlap Bennett & Ludwig PLLC

(57)                    ABSTRACT

A windshield motor gear is provided. The windshield motor gear includes a semi-circular mass and a cuboid mass forming an integrated structure of the windshield motor gear, wherein the semi-circular mass is centrally disposed along a first side of the cuboid mass. The semi-circular mass has a concentrically disposed threaded hole. The cuboid mass includes a plurality vertical through-holes communicating said first side to an opposing second side of the cuboid mass, wherein at least one vertical through holes is disposed on both sides of the semi-circular mass; and a plurality horizontal through-holes communicating opposing third and fourth sides of the cuboid mass, wherein at least one vertical through holes is disposed on both sides of the semi-circular mass; and threads of the threaded hole enable the motor gear to be attached to a windshield motor assembly.

6 Claims, 3 Drawing Sheets

(56) References Cited

U.S. PATENT DOCUMENTS

| | | |
|---|---|---|
| 2004/0035236 A1 | 2/2004 | Stubner et al. |
| 2019/0232920 A1 | 8/2019 | Villemin et al. |
| 2019/0337488 A1 | 11/2019 | Thirunarayana et al. |

* cited by examiner

WINDSHIELD MOTOR GEAR

CROSS-REFERENCE TO RELATED APPLICATION

This application claims the benefit of priority of U.S. provisional application No. 63/596,838, U.S. provisional application number filed Nov. 7, 2023, the contents of which are herein incorporated by reference.

BACKGROUND OF THE INVENTION

The present invention relates to motor gears, and more particularly to a powered windshield motor gear for motorcycles.

A powered windshield in a motorcycle is a helpful feature that provides immense benefits to the motorcycle driver. In such a motorcycle, the windshield is moved (or raised) up and down electronically via a windshield motor assembly based on user inputs.

It is known that with time and regular up and down movement of the windshield, the internal gear (specifically the internal threads) of the assembly wears down or strips out, resulting in sub-optimal performance of the assembly. Original equipment manufacturers (OEM) typically have plastic gears that operatively associate with a stainless-steel worm gear, which tend to strip the plastic gears, rendering the overall assembly unusable. Windshield motor assemblies vary among manufacturers; specifically, different manufactures utilize different thread pitches for the windshield motor assemblies.

As can be seen, there is a need for a powered windshield motor gear for motorcycles configured to withstand regular usage of the windshield motor assembly. Wherein the powered windshield motor gear is configured to fit threads on multiple assemblies.

SUMMARY OF THE INVENTION

In accordance with embodiments of the invention, there is provided a motor gear. The motor gear includes a first portion and a second portion forming an integrated structure of the motor gear. The first portion and the second portion are made of billet aluminum. The first portion is shaped as a hollow semi-circular arc having threads disposed at an interior surface of the first portion. The second portion is shaped as a solid cuboid having one or more through-holes. The threads and the through-holes enable the motor gear to be attached to a windshield motor assembly.

The motor gear, as described herein the present disclosure, fits different windshield motor assembly part numbers, which may have different main worm gear measurements from manufacturing year to year and model to model. Further, the gear is made of a different material (e.g., billet aluminum) than the material (e.g., plastic) used in a conventional gear, thus resulting in longer usage/shelf life.

In one aspect of the present invention, a windshield motor gear includes the following: a semi-circular mass and a cuboid mass forming an integrated structure of the windshield motor gear, wherein the semi-circular mass is centrally disposed along a first side of the cuboid mass: the semi-circular mass has a concentrically disposed threaded hole; the cuboid mass further including the following: a plurality vertical through-holes communicating said first side to an opposing second side of the cuboid mass, wherein at least one vertical through holes is disposed on both sides of the semi-circular mass; and a plurality horizontal through-holes communicating opposing third and fourth sides of the cuboid mass, wherein at least one vertical through holes is disposed on both sides of the semi-circular mass; and threads of the threaded hole enable the motor gear to be attached to a windshield motor assembly.

In another aspect of the present invention, the windshield motor gear further includes wherein the mass of the cuboid mass and the semi-circular mass is billet aluminum; a bottom slot along the second side of the cuboid mass, wherein the windshield motor gear has bilateral symmetry, wherein the billet aluminum enables a thread pitch of the threads to be selectively modified to match a windshield motor assembly.

In yet another aspect of the present invention, a method of improving a powered windshield motor assembly of a motorcycle includes replacing the original equipment manufacturer gear for the powered windshield assembly with above-mentioned the windshield motor gear.

These and other features, aspects and advantages of the present invention will become better understood with reference to the following drawings, description and claims.

DETAILED DESCRIPTION OF THE INVENTION

Figure 1:
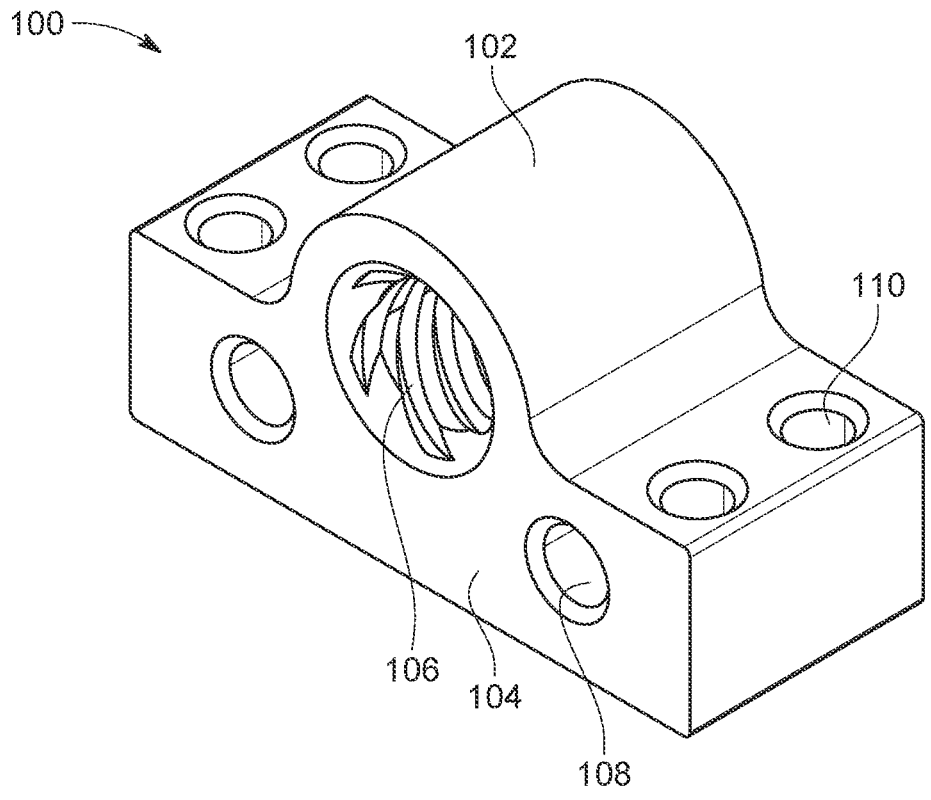
FIG. 1 is a top perspective view of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Referring to FIGS. 1 through 5, the present invention may include a gear for a powered windshield motor assembly 100 (hereafter, "gear") configured to fit into a windshield motor assembly for powered windscreen for motorcycles (e.g., Indian™ motorcycles). The gear 100 is specifically configured to fit across multiple windshield motor assemblies from different manufactures, thereby providing a one-size-fits-all feature. Once installed, gear 100 enables the windshield motor assembly to function as intended.

In some embodiments, gear 100 is made of pure billet aluminum, and includes a first portion 102 and a second portion 104. The first portion 102 and the second portion 104 form an integrated structure of gear 100.

In certain embodiments, the first portion 102 is shaped as a hollow semi-semicircular arc centered along an upper surface of the second portion 104, or base. The first portion 102 provides a threaded hole 106, wherein the center of the hole is approximately in line with the upper surface of the second portion 104. The threads 106 are engineered to fit into different makes, models, and variations of different windshield motor assemblies. The threads 106 enable an operator to securely fit gear 100 into the windshield motor assembly.

Figure 2:
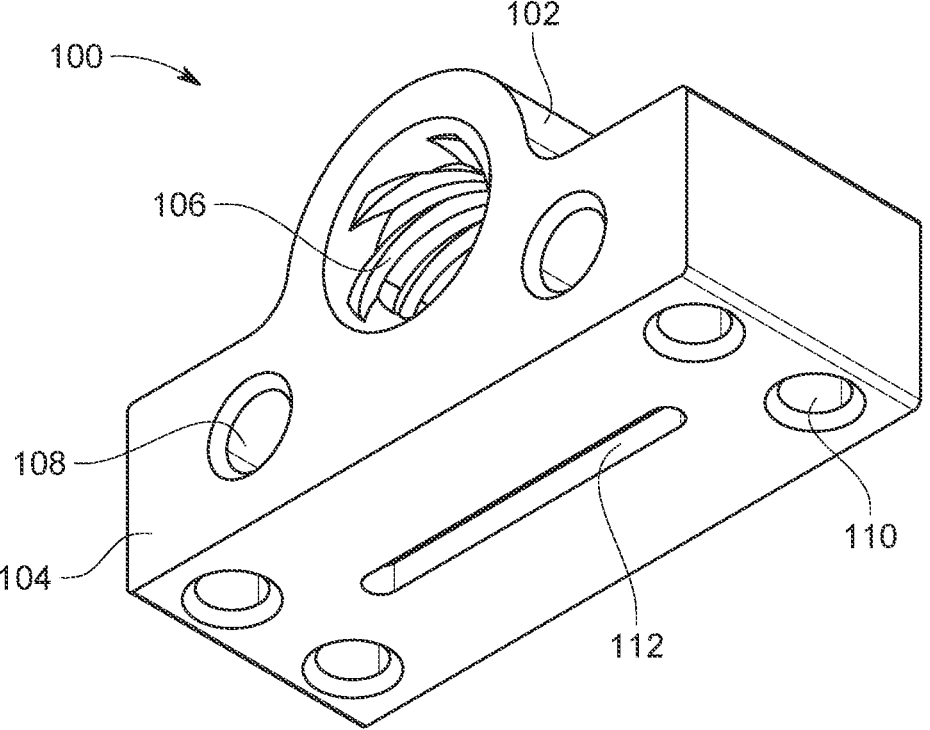
FIG. 2 is a bottom perspective view of an exemplary embodiment of the present invention.
Figure 3:
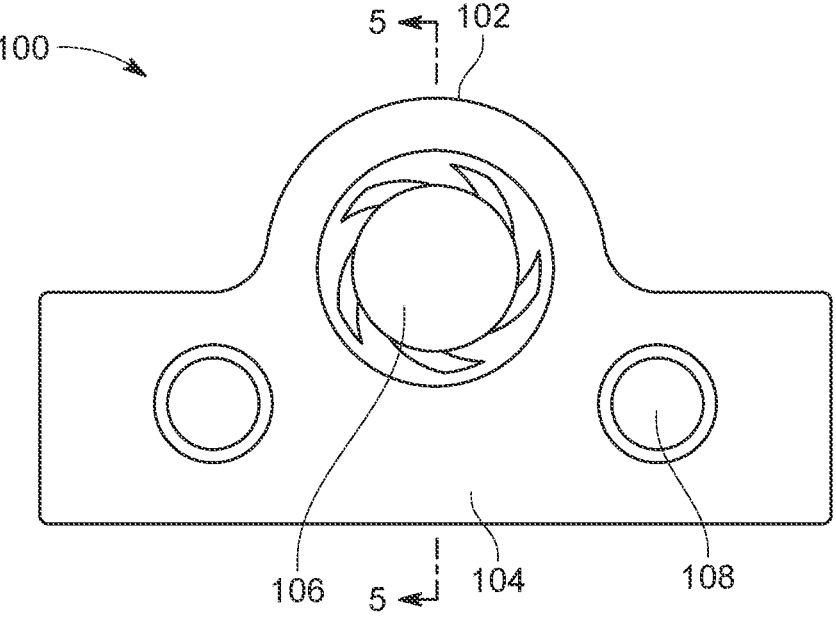
FIG. 3 is a front elevation view of an exemplary embodiment of the present invention.
Figure 4:
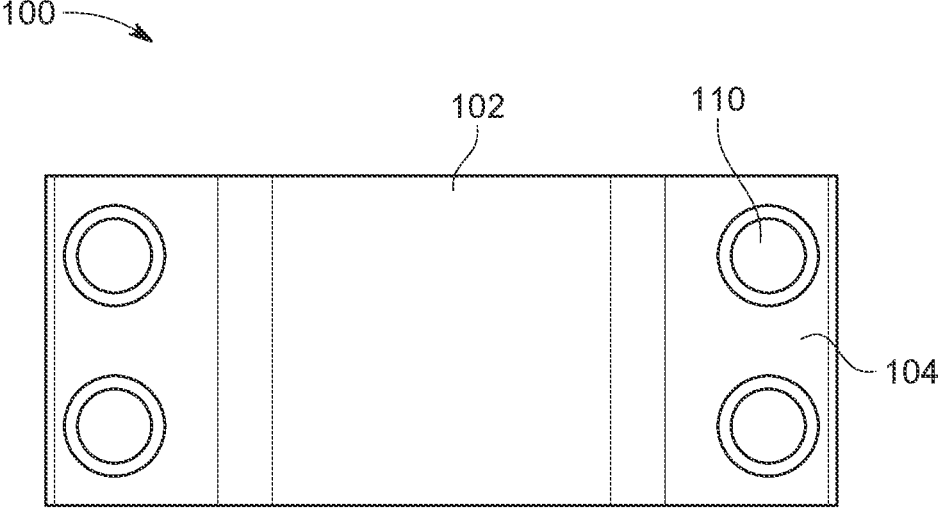
FIG. 4 is a top plan view of an exemplary embodiment of the present invention.
Figure 5:
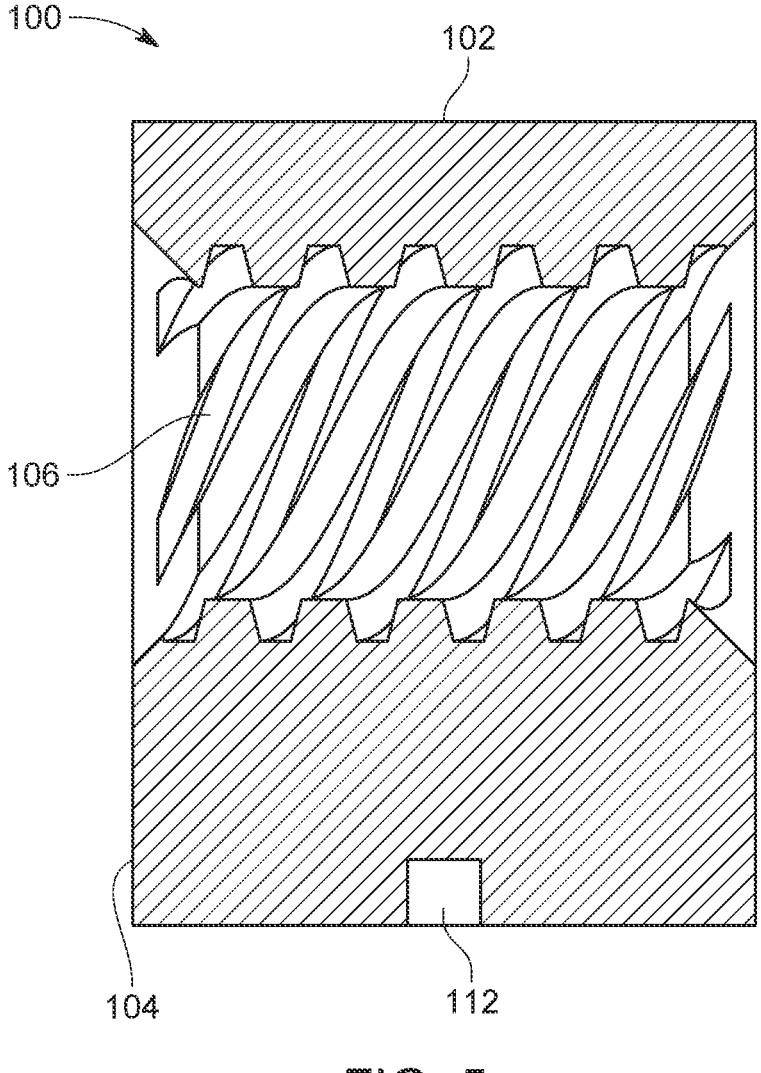
FIG. 5 is a section view of an exemplary embodiment of the present invention, taken along line 5-5 in FIG. 3 through the threaded hole 106.

In certain embodiments, the second portion 104 is shaped as a solid cuboid. Further, the second portion 104 may include four vertical through-holes 110, which may pass through the upper surface, the second portion 104 and communicate with a lower surface of the second portion 104, as shown in FIGS. 1 and 2. Furthermore, two of the four vertical through-holes 110 may be disposed at a left side of the second portion 104 and the other two of four vertical through-holes 110 may be disposed at a right side of the second portion 104, thereby providing two vertical through-holes on each side of the first portion 102.

In certain embodiments, the second portion 104 may provide having one or more horizontal through-holes 108 that pass through the second portion 104, from a front fact to a rear face. In an exemplary embodiment, the second portion 104 includes two horizontal through-holes 108, one disposed to the left of the first portion 102 and the other to the right of the first portion 102.

The first and second through-holes 108, 110 enable the operator to securely fit the gear 100 into the windshield motor assembly. Further, dimensions and shapes of the first and second through-holes 108, 110 are optimized to fit into different makes, models, and variations of different windshield motor assemblies.

In certain embodiments, the gear 100 is a single structure, preferably approximately 2"×1"×¾" with small radius along the side, multiple interior thread pitches, notched as necessary, drilled, and tapped may be provided to facilitate operative association with the different windshield motor assemblies. In operation, the operator may simply remove a failed gear from a windshield motor assembly and fit the gear 100 into the windshield motor assembly. The gear 100 is easy to install, and since gear 100 is made of billet aluminum, the gear 100 lasts longer than conventional gears.

The lower surface of the second portion 104 may provide a bottom slot 112 that runs longitudinally and centrally along the lower surface. The bottom slot 112 is to facilitate the fit and operative association with the windshield motor. The gear 100 may have bilateral symmetry about and line running along line 5-5 in FIG. 3 as well as a line running longitudinally down the middle of FIG. 4.

To manufacture gear 100, the manufacturer may reverse engineer OEM part for general size, measure different thread sizes, pitches, etc. The manufacturer may then find and test over multiple assembly variations, create scanned, scaled drawings, procure material (preferably aluminum, bronze, or other material type), machine, drill, tap, notch, etch, etc. to configure the gear 100 as described above.

In certain embodiments, gear 100 may be installed up or down, front, or back, or threads entering either direction along main worm gear.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A windshield motor gear comprising:
   a semi-circular mass and a cuboid mass forming an integrated structure of the windshield motor gear, wherein the semi-circular mass is centrally disposed along a first side of the cuboid mass:
   the semi-circular mass has a concentrically disposed threaded hole;
   the cuboid mass comprising:
      a plurality of vertical through-holes communicating said first side to an opposing second side of the cuboid mass, wherein at least one of said plurality of vertical through holes is disposed on both sides of the semi-circular mass; and
      a plurality of horizontal through-holes communicating opposing third and fourth sides of the cuboid mass, wherein at least one of said plurality of vertical through holes is disposed on both sides of the semi-circular mass; and
   threads of the threaded hole enable the motor gear to be attached to a windshield motor assembly.

2. The windshield motor gear of claim 1, further comprising wherein the mass of the cuboid mass and the semi-circular mass is billet aluminum.

3. The windshield motor gear of claim 2, further comprising a bottom slot along the second side of the cuboid mass.

4. The windshield motor gear of claim 3, wherein the windshield motor gear has bilateral symmetry.

5. The windshield motor gear of claim 3, wherein the billet aluminum enables a thread pitch of the threads to be selectively modified to match a windshield motor assembly.

6. A method of improving a powered windshield motor assembly of a motorcycle, the method comprising replacing the original equipment manufacturer gear for the powered windshield assembly with the windshield motor gear of claim 1.

\* \* \* \* \*